(12) United States Patent
Zhao et al.

(10) Patent No.: US 12,133,168 B2
(45) Date of Patent: Oct. 29, 2024

(54) ENERGY-SAVING DOWNLINK CONTROL CHANNEL INFORMATION TRANSMISSION METHOD, USER EQUIPMENT AND NETWORK DEVICE

(71) Applicant: DATANG MOBILE COMMUNICATIONS EQUIPMENT CO., LTD., Beijing (CN)

(72) Inventors: Zheng Zhao, Beijing (CN); Jiaqing Wang, Beijing (CN); Meiying Yang, Beijing (CN); Chen Luo, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 376 days.

(21) Appl. No.: 17/631,708

(22) PCT Filed: Jul. 1, 2020

(86) PCT No.: PCT/CN2020/099709
§ 371 (c)(1),
(2) Date: Jan. 31, 2022

(87) PCT Pub. No.: WO2021/017741
PCT Pub. Date: Feb. 4, 2021

(65) Prior Publication Data
US 2022/0272629 A1     Aug. 25, 2022

(30) Foreign Application Priority Data
Aug. 1, 2019    (CN) .................. 201910709188.X

(51) Int. Cl.
*G08C 17/00*     (2006.01)
*H04W 52/02*     (2009.01)
(Continued)

(52) U.S. Cl.
CPC ....... *H04W 52/0216* (2013.01); *H04W 72/23* (2023.01); *H04W 76/28* (2018.02)

(58) Field of Classification Search
CPC .. H04W 52/0216; H04W 76/28; H04W 72/23
(Continued)

(56) References Cited

U.S. PATENT DOCUMENTS

| 2017/0280481 A1 | 9/2017 | Stern-Berkowitz et al. |
| 2018/0270756 A1 | 9/2018 | Bhattad et al. |

(Continued)

FOREIGN PATENT DOCUMENTS

| CN | 103906085 A | 7/2014 |
| CN | 107079499 A | 8/2017 |

(Continued)

OTHER PUBLICATIONS

Extended European Search Report dated Aug. 22, 2022 for EP Application No. 20847552.5.

(Continued)

*Primary Examiner* — Temica M Beamer
(74) *Attorney, Agent, or Firm* — Harness, Dickey & Pierce, P.L.C.

(57) ABSTRACT

Embodiments of the present disclosure provide an energy-saving downlink control channel information transmission method, user equipment and network device. The method includes: determining states of UEs corresponding to each of N time periods associated with a first energy-saving downlink control channel monitor occasion, where the states of UEs includes an awake state and a sleep state; generating energy-saving downlink control channel information used to indicate the states of UEs; and issuing the energy-saving downlink control channel information at the first energy-saving downlink control channel monitor occasion.

19 Claims, 5 Drawing Sheets

(51) Int. Cl.
*H04W 72/23* (2023.01)
*H04W 76/28* (2018.01)

(58) Field of Classification Search
USPC .......................................................... 370/311
See application file for complete search history.

(56) References Cited

U.S. PATENT DOCUMENTS

| | | | |
|---|---|---|---|
| 2018/0352511 A1* | 12/2018 | Martin | .............. H04W 52/0229 |
| 2019/0082453 A1 | 3/2019 | Lyu et al. | |
| 2019/0150114 A1* | 5/2019 | Liu | .................. H04W 52/0229 |
| | | | 370/252 |
| 2020/0322946 A1 | 10/2020 | Jiang et al. | |
| 2020/0389871 A1 | 12/2020 | Wang | |
| 2021/0127334 A1 | 4/2021 | Zhu | |
| 2022/0015127 A1 | 1/2022 | Yang et al. | |

FOREIGN PATENT DOCUMENTS

| | | |
|---|---|---|
| CN | 107370562 A | 11/2017 |
| CN | 109150418 A | 1/2019 |
| CN | 109309957 A | 2/2019 |
| CN | 109429258 A | 3/2019 |
| CN | 109451843 A | 3/2019 |
| CN | 109963339 A | 7/2019 |
| CN | 111356213 A | 6/2020 |
| EP | 3735068 A1 | 11/2020 |
| EP | 3905753 A1 | 11/2021 |
| TW | 201842801 A | 12/2018 |
| WO | WO-2019/035701 A1 | 2/2019 |
| WO | WO-2019/128580 A1 | 7/2019 |

OTHER PUBLICATIONS

CATT, "UE Power saving schemes and power saving signal/channel", Agenda Item 7.2.9.2, 3GPP TSG RAN WG1 Meeting #96, R1-1902025, Athens, Greece, Feb. 25-Mar. 1, 2019.
CATT, "PDCCH based power saving signal/channel design", Agenda Item 7.2.9.1, 3GPP TSG RAN WG1 #96bis, R1-1905368, Xi'an, China, Apr. 8-12, 2019.
International Search Report and Written Opinion issued Sep. 25, 2020 in International Application No. PCT/CN2020/099709.
Samsung, "PDCCH-Based Power Saving Signal/Channel", 3GPP TSG RAN WG1#97 R1-1906980, May 3, 2019.
CATT, "PDCCH-Based Power Saving signal/Channel Design", 3GPP TSG RAN WG1 Meeting #97 R1-1906350, May 4, 2019.
1st Office Action issued May 14, 2021 in Chinese Application No. 201910709188.

* cited by examiner receiving, by the UE, energy-saving downlink control channel information at a first energy-saving downlink control channel monitor occasion; — 801 according to the received energy-saving downlink control channel information, determining, by the UE, a state of the UE corresponding to each of N time periods associated with the first energy-saving downlink control channel monitor occasion — 801

FIG. 8

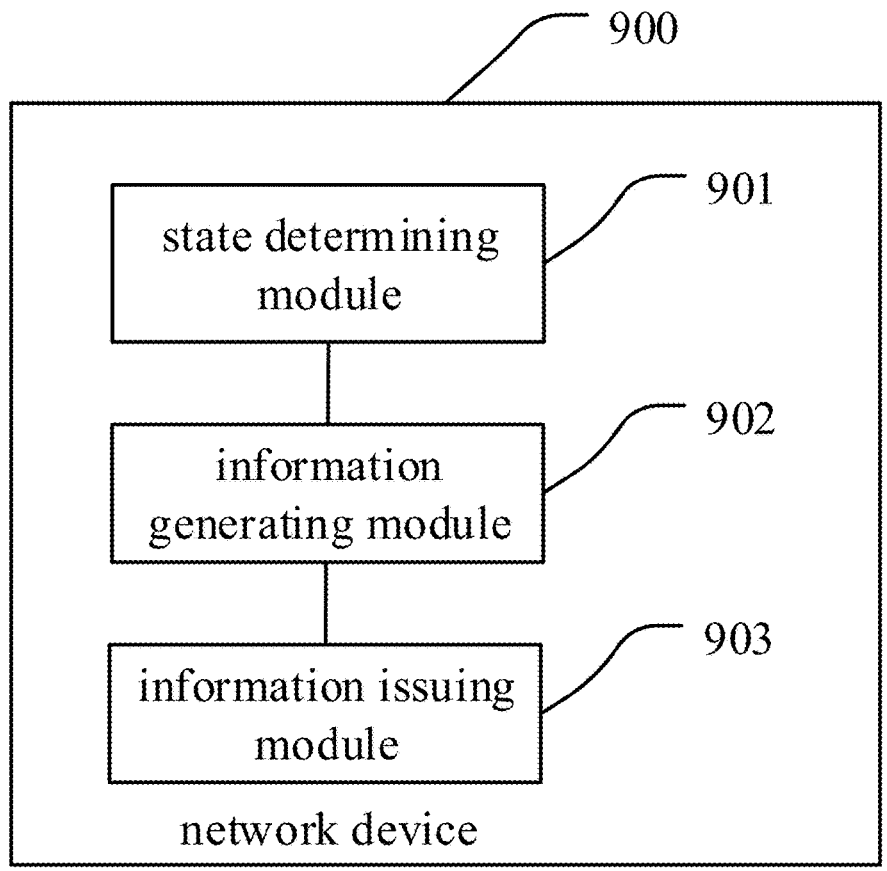

FIG. 9

ENERGY-SAVING DOWNLINK CONTROL CHANNEL INFORMATION TRANSMISSION METHOD, USER EQUIPMENT AND NETWORK DEVICE

CROSS-REFERENCE TO RELATED APPLICATION

This application is the U.S. national phase of PCT Application PCT/CN2020/099709 filed on Jul. 1, 2020, which claims the priority of Chinese Application No. 201910709188.X, filed on Aug. 1, 2019, the disclosures of which are incorporated in their entirety by reference herein.

TECHNICAL FIELD

The present disclosure relates to the field of communication technologies, and in particular to an energy-saving downlink control channel information transmission method, user equipment and network device.

BACKGROUND

In the long term evolution (LTE) and new radio (NR) systems, a user equipment (UE) in a connected state needs to detect physical downlink control channel (PDCCH) monitor occasions configured in all slots. However, in most PDCCH monitor occasions, a base station does not send PDCCH (data), and these PDCCH detections are not necessary. Since the UE consumes power for PDCCH detections, these PDCCH detections will consume energy of the UE in vain.

SUMMARY

Embodiments of the present disclosure provide an energy-saving downlink control channel information transmission method, UE and network device, which can solve the problems of waste of power consumption of UEs due to that the UEs still perform PDCCH detection when a base station does not send PDCCH.

In order to achieve the above object, one embodiment of the present disclosure provides an energy-saving downlink control channel information transmission method, including:
  determining states of UEs corresponding to each of N time periods associated with a first energy-saving downlink control channel monitor occasion; wherein the states of UEs includes an awake state and a sleep state;
  generating energy-saving downlink control channel information used to indicate the states of UEs; and
  issuing the energy-saving downlink control channel information at the first energy-saving downlink control channel monitor occasion.

Optionally, the generating energy-saving downlink control channel information used to indicate the states of UEs, includes: in case that the states of UEs corresponding to at least one of the N time periods is the awake state, generating the energy-saving downlink control channel information used to indicate the states of UEs.

Optionally, before determining states of UEs corresponding to each of N time periods associated with a first energy-saving downlink control channel monitor occasion, the method further includes:
  determining first information, wherein the first information includes at least one of the following:
    energy-saving downlink control channel monitor occasion;
    the number N of the N time periods associated with the first energy-saving downlink control channel monitor occasion;
    time-related information of the time period;
    the number of bits occupied by energy-saving downlink control channel information of each UE;
    the number of time periods corresponding to each bit of n bits;
    function indication information related to wake-up of the UEs;
    function indication information related to sleep of the UEs.

Optionally, the energy-saving downlink control channel information further includes function indication information related to wake-up of the UEs and/or function indication information related to sleep of the UEs.

Optionally, each bit in the energy-saving downlink control channel information is used to indicate states of UEs corresponding to one or more time periods; or,
  n bits in the energy-saving downlink control channel information are used to jointly indicate states of UEs corresponding to k time periods, wherein n and k are integers greater than 1, and n<k≤N.

Optionally, a sum of durations of the N time periods is equal to at least one long discontinuous reception cycle of the UEs, and one time period is equal to one short discontinuous reception cycle of the UEs.

Optionally, there is at least one second energy-saving downlink control channel monitor occasion in the N time periods.

Optionally, after issuing the energy-saving downlink control channel information at the first energy-saving downlink control channel monitor occasion, the method further includes:
  in case of issuing energy-saving downlink control channel information at the second energy-saving downlink control channel monitor occasion, obtaining states of UEs corresponding to each of N time periods associated with the second energy-saving downlink control channel monitor occasion; and
  generating, and issuing at the second energy-saving downlink control channel monitor occasion, energy-saving downlink control channel information for indicating the states of UEs corresponding to each of N time periods associated with the second energy-saving downlink control channel monitor occasion.

Optionally, after issuing the energy-saving downlink control channel information at the first energy-saving downlink control channel monitor occasion, the method further includes:
  in case of issuing energy-saving downlink control channel information at the second energy-saving downlink control channel monitor occasion, obtaining states of UEs corresponding to each of time periods, which are in the N time periods and are after the second energy-saving downlink control channel monitor occasion;
  generating, and issuing at the second energy-saving downlink control channel monitor occasion, energy-saving downlink control channel information for indicating the states of UEs corresponding to each of time periods, which are in the N time periods and are after the second energy-saving downlink control channel monitor occasion.

Optionally, the method further includes: after sending the energy-saving downlink control channel information last time, in case that no indication information for indicating that the UEs have received the energy-saving downlink control channel information sent last time, determining that it is necessary to issue energy-saving downlink control channel information at the second energy-saving downlink control channel monitor occasion.

Optionally, the indication information for indicating that the UEs have received the energy-saving downlink control channel information sent last time, is an acknowledgement (ACK) or a negative acknowledge (NACK); the acknowledgement or the negative acknowledge is sent by the UEs for a detection result of a downlink control channel detection performed after the UEs wake up.

Optionally, the method further includes: in case that the states of UEs corresponding to at least one of time periods, which are in the N time periods and are after the second energy-saving downlink control channel monitor occasion, is the awake state, determining that it is necessary to issue energy-saving downlink control channel information at the second energy-saving downlink control channel monitor occasion.

One embodiment of the present disclosure provides an energy-saving downlink control channel information transmission method, including:
  receiving energy-saving downlink control channel information at a first energy-saving downlink control channel monitor occasion;
  according to the received energy-saving downlink control channel information, determining a state of the UE corresponding to each of N time periods associated with the first energy-saving downlink control channel monitor occasion; wherein the state of the UE includes an awake state or a sleep state.

Optionally, before receiving energy-saving downlink control channel information at a first energy-saving downlink control channel monitor occasion, the method further includes:
  receiving first information, wherein the first information includes at least one of the following:
  energy-saving downlink control channel monitor occasion;
  the number N of the N time periods associated with the first energy-saving downlink control channel monitor occasion;
  time-related information of the time period;
  the number of bits occupied by energy-saving downlink control channel information of each UE;
  the number of time periods corresponding to each bit of n bits;
  function indication information related to wake-up of the UE;
  function indication information related to sleep of the UE.

Optionally, before, according to the received energy-saving downlink control channel information, determining a state of the UE corresponding to each of N time periods associated with the first energy-saving downlink control channel monitor occasion, the method further includes:
  determining the number N of the time periods according to a time interval between two adjacent energy-saving downlink control channel monitor occasions and a duration of the time period; and/or,
  determining the number of time periods corresponding to each bit according to the time interval between two adjacent energy-saving downlink control channel monitor occasions, the duration of the time period, and the number of bits occupied by the energy-saving downlink control channel information of the UE.

Optionally, after, according to the received energy-saving downlink control channel information, determining a state of the UE corresponding to each of N time periods associated with the first energy-saving downlink control channel monitor occasion, the method further includes:
  in case that there is a second energy-saving downlink control channel monitor occasion between a first time period and a second time period which are adjacent in the N time periods, and the states of the UE corresponding to the second time period is the sleep state, keeping or entering the sleep state at the second energy-saving downlink control channel monitor occasion.

One embodiment of the present disclosure provides a network device, including:
  a state determining module configured to determine states of UEs corresponding to each of N time periods associated with a first energy-saving downlink control channel monitor occasion; wherein the states of UEs includes an awake state and a sleep state;
  an information generating module configured to generate energy-saving downlink control channel information used to indicate the states of UEs;
  an information issuing module configured to issue the energy-saving downlink control channel information at the first energy-saving downlink control channel monitor occasion.

Optionally, the information generating module is configured to, in case that the states of UEs corresponding to at least one of the N time periods is the awake state, generate the energy-saving downlink control channel information used to indicate the states of UEs.

Optionally, the network device further includes:
  an information determining module configured to determine first information, wherein the first information includes at least one of the following:
  energy-saving downlink control channel monitor occasion;
  the number N of the N time periods associated with the first energy-saving downlink control channel monitor occasion;
  time-related information of the time period;
  the number of bits occupied by energy-saving downlink control channel information of each UE;
  the number of time periods corresponding to each bit of n bits;
  function indication information related to wake-up of the UEs;
  function indication information related to sleep of the UEs.

Optionally, each bit in the energy-saving downlink control channel information is used to indicate states of UEs corresponding to one or more time periods; or,
  n bits in the energy-saving downlink control channel information are used to jointly indicate states of UEs corresponding to k time periods, n and k are integers greater than 1, and n<k≤N.

Optionally, a sum of durations of the N time periods is equal to at least one long discontinuous reception cycle of the UEs, and one time period is equal to one short discontinuous reception cycle of the UEs.

Optionally, there is at least one second energy-saving downlink control channel monitor occasion in the N time periods.

Optionally, the network device further includes:
  a first state obtaining module configured to, in case of issuing energy-saving downlink control channel information at the second energy-saving downlink control channel monitor occasion, obtain states of UEs corresponding to each of N time periods associated with the second energy-saving downlink control channel monitor occasion;

a first generating and issuing module configured to generate and issue at the second energy-saving downlink control channel monitor occasion, energy-saving downlink control channel information for indicating the states of UEs corresponding to each of N time periods associated with the second energy-saving downlink control channel monitor occasion.

Optionally, the network device further includes:

a second state obtaining module configured to, in case of issuing energy-saving downlink control channel information at the second energy-saving downlink control channel monitor occasion, obtain states of UEs corresponding to each of time periods, which are in the N time periods and are after the second energy-saving downlink control channel monitor occasion;

a second generating and issuing module configured to generate and issue at the second energy-saving downlink control channel monitor occasion, energy-saving downlink control channel information for indicating the states of UEs corresponding to each of time periods, which are in the N time periods and are after the second energy-saving downlink control channel monitor occasion.

Optionally, the network device further includes: a first information-issuing determining module configured to, after sending the energy-saving downlink control channel information last time, in case that no indication information for indicating that the UEs have received the energy-saving downlink control channel information sent last time, determine that it is necessary to issue energy-saving downlink control channel information at the second energy-saving downlink control channel monitor occasion.

Optionally, the indication information for indicating that the UEs have received the energy-saving downlink control channel information sent last time, is an acknowledgement (ACK) or a negative acknowledge (NACK); the acknowledgement or the negative acknowledge is sent by the UEs for a detection result of a downlink control channel detection performed after the UEs wake up.

Optionally, the network device further includes: a second information-issuing determining module configured to, in case that the states of UEs corresponding to at least one of time periods, which are in the N time periods and are after the second energy-saving downlink control channel monitor occasion, is the wake-up state, determine that it is necessary to issue energy-saving downlink control channel information at the second energy-saving downlink control channel monitor occasion.

One embodiment of the present disclosure provides a user equipment (UE), including:

a receiving module configured to receive energy-saving downlink control channel information at a first energy-saving downlink control channel monitor occasion; and a UE-state determining module configured to, according to the received energy-saving downlink control channel information, determine states of the UE corresponding to each of N time periods associated with the first energy-saving downlink control channel monitor occasion; wherein the state of the UE includes an awake state or a sleep state.

Optionally, the UE further includes:

a first information receiving module configured to receive first information, wherein the first information includes at least one of the following:

energy-saving downlink control channel monitor occasion;

the number N of the N time periods associated with the first energy-saving downlink control channel monitor occasion;

time-related information of the time period;

the number of bits occupied by energy-saving downlink control channel information of each UE;

the number of time periods corresponding to each bit of n bits;

function indication information related to wake-up of the UE;

function indication information related to sleep of the UE.

Optionally, the UE further includes:

a first determining module configured to determine the number N of the time periods according to a time interval between two adjacent energy-saving downlink control channel monitor occasions and a duration of the time period; and/or, a second determining module configured to determine the number of time periods corresponding to each bit according to the time interval between two adjacent energy-saving downlink control channel monitor occasions, the duration of the time period, and the number of bits occupied by the energy-saving downlink control channel information of the UE.

One embodiment of the present disclosure provides a network device, including: a transceiver, a memory, a processor, and a computer program stored on the memory and executable on the processor; wherein the processor executes the computer program to perform:

determining states of UEs corresponding to each of N time periods associated with a first energy-saving downlink control channel monitor occasion;

wherein the states of UEs includes an awake state and a sleep state;

generating energy-saving downlink control channel information used to indicate the states of UEs; and issuing the energy-saving downlink control channel information at the first energy-saving downlink control channel monitor occasion.

Optionally, the processor executes the computer program to perform the following steps:

when generating energy-saving downlink control channel information used to indicate the states of UEs, in case that the states of UEs corresponding to at least one of the N time periods is the awake state, generating the energy-saving downlink control channel information used to indicate the states of UEs.

Optionally, the processor executes the computer program to perform the following steps:

before determining states of UEs corresponding to each of N time periods associated with a first energy-saving downlink control channel monitor occasion, determining first information, wherein the first information includes at least one of the following:

energy-saving downlink control channel monitor occasion;

the number N of the N time periods associated with the first energy-saving downlink control channel monitor occasion;

time-related information of the time period;

the number of bits occupied by energy-saving downlink control channel information of each UE;

the number of time periods corresponding to each bit of n bits;

function indication information related to wake-up of the UEs;

function indication information related to sleep of the UEs.

Optionally, each bit in the energy-saving downlink control channel information is used to indicate states of UEs corresponding to one or more time periods; or, n bits in the energy-saving downlink control channel information are used to jointly indicate states of UEs corresponding to k time periods, wherein n and k are integers greater than 1, and n<k≤N.

Optionally, a sum of durations of the N time periods is equal to at least one long discontinuous reception cycle of the UEs, and one time period is equal to one short discontinuous reception cycle of the UEs.

Optionally, there is at least one second energy-saving downlink control channel monitor occasion in the N time periods.

Optionally, the processor executes the computer program to perform the following steps:

after issuing the energy-saving downlink control channel information at the first energy-saving downlink control channel monitor occasion, in case of issuing energy-saving downlink control channel information at the second energy-saving downlink control channel monitor occasion, obtaining states of UEs corresponding to each of N time periods associated with the second energy-saving downlink control channel monitor occasion; and generating, and issuing at the second energy-saving downlink control channel monitor occasion, energy-saving downlink control channel information for indicating the states of UEs corresponding to each of N time periods associated with the second energy-saving downlink control channel monitor occasion.

Optionally, the processor executes the computer program to perform the following steps:

after issuing the energy-saving downlink control channel information at the first energy-saving downlink control channel monitor occasion, in case of issuing energy-saving downlink control channel information at the second energy-saving downlink control channel monitor occasion, obtaining states of UEs corresponding to each of time periods, which are in the N time periods and are after the second energy-saving downlink control channel monitor occasion;

generating, and issuing at the second energy-saving downlink control channel monitor occasion, energy-saving downlink control channel information for indicating the states of UEs corresponding to each of time periods, which are in the N time periods and are after the second energy-saving downlink control channel monitor occasion.

Optionally, the processor executes the computer program to perform the following steps: after sending the energy-saving downlink control channel information last time, in case that no indication information for indicating that the UEs have received the energy-saving downlink control channel information sent last time, determining that it is necessary to issue energy-saving downlink control channel information at the second energy-saving downlink control channel monitor occasion.

Optionally, the indication information for indicating that the UEs have received the energy-saving downlink control channel information sent last time, is an acknowledgement (ACK) or a negative acknowledge (NACK); the acknowledgement or the negative acknowledge is sent by the UEs for a detection result of a downlink control channel detection performed after the UEs wake up.

One embodiment of the present disclosure provides a UE, including: a transceiver, a memory, a processor, and a computer program stored on the memory and executable on the processor; wherein the processor executes the computer program to perform:

receiving energy-saving downlink control channel information at a first energy-saving downlink control channel monitor occasion;

according to the received energy-saving downlink control channel information, determining a state of the UE corresponding to each of N time periods associated with the first energy-saving downlink control channel monitor occasion; wherein the states of UEs includes an awake state and a sleep state.

Optionally, the processor executes the computer program to perform:

before receiving energy-saving downlink control channel information at a first energy-saving downlink control channel monitor occasion, receiving first information, wherein the first information includes at least one of the following:

energy-saving downlink control channel monitor occasion;

the number N of the N time periods associated with the first energy-saving downlink control channel monitor occasion;

time-related information of the time period;

the number of bits occupied by energy-saving downlink control channel information of each UE;

the number of time periods corresponding to each bit of n bits;

function indication information related to wake-up of the UE;

function indication information related to sleep of the UE.

Optionally, the processor executes the computer program to perform:

before, according to the received energy-saving downlink control channel information, determining states of UEs corresponding to each of N time periods associated with the first energy-saving downlink control channel monitor occasion, determining the number N of the time periods according to a time interval between two adjacent energy-saving downlink control channel monitor occasions and a duration of the time period; and/or, determining the number of time periods corresponding to each bit according to the time interval between two adjacent energy-saving downlink control channel monitor occasions, the duration of the time period, and the number of bits occupied by the energy-saving downlink control channel information of the UE.

Optionally, the processor executes the computer program to perform:

after, according to the received energy-saving downlink control channel information, determining states of UEs corresponding to each of N time periods associated with the first energy-saving downlink control channel monitor occasion, in case that there is a second energy-saving downlink control channel monitor occasion between a first time period and a second time period which are adjacent in the N time periods, and the states of the UE corresponding to the second time period is the sleep state, keeping or entering the sleep state at the second energy-saving downlink control channel monitor occasion.

One embodiment of the present disclosure provides a computer-readable storage medium, including a computer program stored thereon; wherein the computer program is executed by a processor to perform the steps in the energy-saving downlink control channel information transmission method on the network device side provided by the embodiment of the present disclosure, or the steps of the energy-saving downlink control channel information transmission method on the UE side provided by the embodiment of the present disclosure.

In the embodiment of the present disclosure, one energy-saving downlink control channel information may indicate states of UEs corresponding to the subsequent multiple time periods, thereby reducing power consumption of the UEs. In addition, compared with the solution in which one energy-saving downlink control channel information can indicate states of UEs only for one time period, the present application can not only save time-frequency resource overhead, reduce a blind detection frequency of the energy-saving PDCCH and thus save more energy, and the UEs do not need to wake up constantly to detect the energy-saving PDCCH, which is convenient for the UEs to enter a deep sleep state.

BRIEF DESCRIPTION OF THE DRAWINGS

FIG. 8 is a schematic flowchart of an energy-saving downlink control channel information transmission method according to a second embodiment of the present disclosure;

FIG. 9 is a schematic diagram of a network device according to a third embodiment of the present disclosure;

DETAILED DESCRIPTION

In order to make technical problems to be solved, technical solutions and advantages of the present disclosure more apparent, the present disclosure will be described hereinafter in conjunction with the drawings and embodiments.

Figures 1, 2:
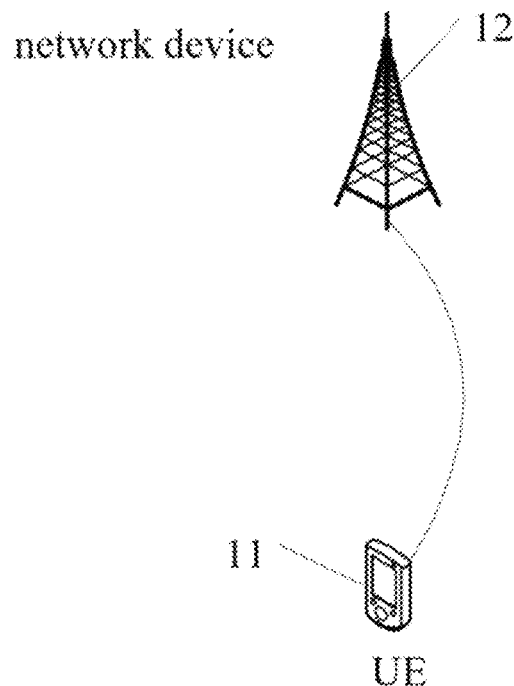
FIG. 1 is a schematic diagram of a network structure to which an embodiment of the present disclosure can be applied.
FIG. 2 is a schematic flowchart of an energy-saving downlink control channel information transmission method according to a first embodiment of the present disclosure.

Referring to FIG. 1, FIG. 1 is a schematic diagram of a network structure to which an embodiment of the present disclosure can be applied. As shown in FIG. 1, the network structure includes a UE 11 and a network device 12. The UE 11 may be a user equipment (UE) or other UE device, such as a mobile phone, a tablet personal computer, a laptop computer, a personal digital assistant (PDA), a mobile internet device (MID) or a wearable device. It should be noted that the specific types of UEs are not limited in the embodiments of the present disclosure. The network device 12 may be a base station, such as a macro station, an LTE eNB, or a 5G NR NB, etc. The network device may also be a small station, such as a low power node (LPN), pico, femto, etc. The network device may also be an access point (AP). The base station may also be a network node composed of a central unit (CU) and multiple transmission reception points (TRP) managed and controlled by the central unit. It should be noted that specific types of network devices are not limited in the embodiments of the present disclosure.

In order to solve problems of waste of power consumption of UEs due to that the UEs still perform PDCCH detection when a base station does not send PDCCH, the base station can use an energy-saving PDCCH to notify UEs whether to perform PDCCH detection in a subsequent time period. For example, in case that the base station is to send PDCCH in a subsequent time period, the base station issues an energy-saving PDCCH to notify the UEs to wake up for performing PDCCH detection in the subsequent time period.

In discontinuous reception (DRX) transmission, in case that the base station configures an energy-saving PDCCH monitor occasion for each DRX cycle, it will lead to an increase in time-frequency resource overhead and an increase in blind detection frequency. Further, the UEs need to constantly wake up to perform energy-saving PDCCH detection, and cannot enter a deep sleep state. In addition, when the base station configures a short DRX cycle for the UEs, the UEs will switch between a long DRX cycle and the short DRX cycle according to data arrival situation. Since the energy-saving PDCCH is set before the DRX cycle, switching between the long and short DRX cycles makes configuration of the energy-saving PDCCH (mainly referring to configuration of energy-saving PDCCH monitor occasions) more complicated, and will increase complexity of the energy-saving PDCCH detection.

In order to solve the foregoing problems, one embodiment of the present disclosure provides an energy-saving downlink control channel information transmission scheme, as detailed below.

Referring to FIG. 2, FIG. 2 is a schematic flowchart of an energy-saving downlink control channel information transmission method according to an embodiment of the present disclosure. The method is performed by a network device and includes the following steps.

Step 201: determining, by the network device, states of UEs corresponding to each of N time periods associated with a first energy-saving downlink control channel monitor occasion; where the states of UEs includes an awake state (also called a wake-up state) and a sleep state, and N is an integer greater than 1.

That is, in the embodiment of the present disclosure, there is at least one energy-saving downlink control channel monitor occasion every N time periods.

Step 202: generating, by the network device, energy-saving downlink control channel information used to indicate the states of UEs.

Step 203: issuing, by the network device, the energy-saving downlink control channel information at the first energy-saving downlink control channel monitor occasion.

In the embodiment of the present disclosure, the network device may be a base station; the first energy-saving downlink control channel monitor occasion may be an upcoming current energy-saving downlink control channel monitor occasion; and the N time periods may be multiple consecutive time periods immediately following the current energy-saving downlink control channel monitor occasion. When the states of UEs is the awake state, PDCCH detection is required; when the states of UEs is the sleep state, PDCCH detection is not required. The energy-saving downlink control channel monitor occasion is referred as power saving (PS) PDCCH, or referred as wake-up (WUS) PDCCH.

In addition, the base station may issue energy-saving downlink control channel information for only one UE at one energy-saving downlink control channel monitor occasion, or may issue energy-saving downlink control channel information for multiple UEs at one energy-saving downlink control channel monitor occasion. That is, an energy-saving PDCCH issued by the base station at an energy-saving downlink control channel monitor occasion, is used to indicate states of one or more UEs in the subsequent time period. For different UEs, the number of time periods associated with one energy-saving downlink control channel monitor occasion may be different; and a duration, starting time and/or ending time of each time period may also be different. Specifically, the energy-saving PDCCH issued by the base station at an energy-saving downlink control channel monitor occasion includes multiple bits, and different UEs of the multiple UEs occupy different bits.

In the embodiment of the present disclosure, one energy-saving downlink control channel information may indicate states of UEs corresponding to the subsequent multiple time periods, thereby reducing power consumption of the UEs. In addition, compared with one energy-saving downlink control channel information that can indicate states of UEs only for one time period, the present application can not only save time-frequency resource overhead, reduce a blind detection frequency of the energy-saving PDCCH and thus save more energy, and the UEs do not need to wake up constantly to detect the energy-saving PDCCH, which is convenient for the UEs to enter a deep sleep state. Moreover, compared with the solution in which one energy-saving downlink control channel information can indicate states of UEs only for one time period, the present application can configure energy-saving PDCCH monitor occasions at a longer time granularity, for indicating wake-up and sleep states within a shorter time range, especially for the case where the system is configured with a short DRX cycle. In this case, the DRX cycle will change with the arrival of data, and energy-saving PDCCH monitor occasions may be configured according to the long DRX cycle, for indicating wake-up and sleep states in the short DRX cycle.

It should be noted that, in the embodiment of the present disclosure, the downlink control channel may be a physical downlink control channel (PDCCH), but this is not limited. In the embodiments of the present disclosure, the downlink control channel may refer to various existing and possible defined control channels in the future, such as an enhanced physical downlink control channel (ePDCCH) or MTC physical downlink control channel (MPDCCH).

In the embodiment of the present disclosure, optionally, a sum of durations of the N time periods is equal to at least one long discontinuous reception cycle (that is, the long DRX cycle) of UES, and one time period is equal to one short discontinuous reception cycle (that is, the short DRX cycle) of the UEs.

Figure 3:
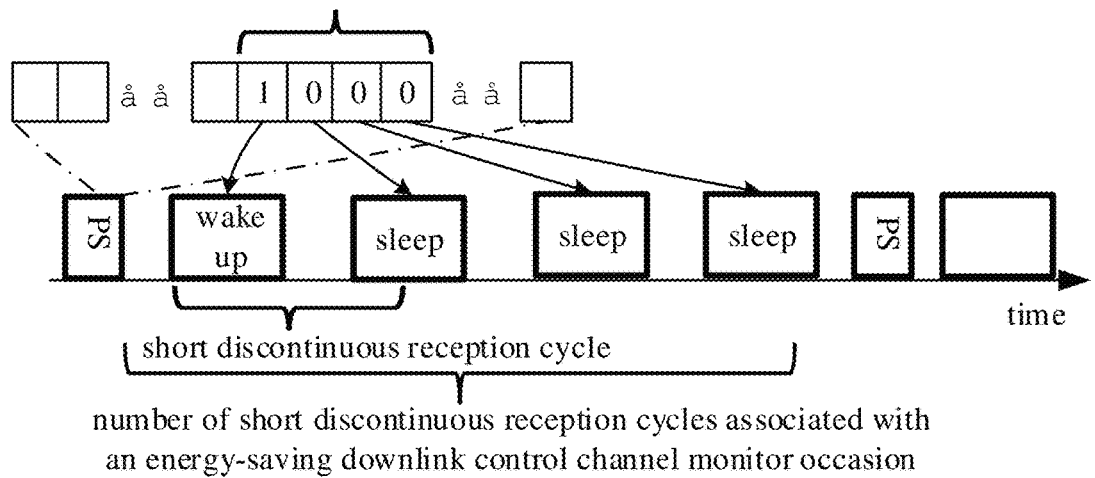
FIG. 3 is a schematic diagram of an indication of an energy-saving downlink control channel according to an embodiment of the present disclosure.

For example, referring to FIG. 3, for a certain UE, the network device allocates 4 bits for the UE to transmit an energy-saving PDCCH at a first energy-saving downlink control channel monitor occasion, and the energy-saving PDCCH is used to indicate states of UEs in four short DRX cycles. In case that the 4 bits of the energy-saving PDCCH are 1000, respectively, it indicates that the states of the UE in the 4 short DRX cycles after the first energy-saving downlink control channel monitor occasion are awake, sleep, sleep and sleep, respectively.

In DRX transmission, the long DRX cycle may range from 10 ms to 10240 ms, and the short DRX cycle may range from 2 ms to 640 ms. In case that the DRX cycle is configured to be small, the network device can learn sleep and wake-up states of the UEs in each DRX cycle in advance before several DRX cycles, and thus one energy-saving PDCCH can be used to indicate the sleep and wake-up states of the UEs in multiple DRX cycles.

In the embodiment of the present disclosure, in order to simplify realization of the energy-saving PDCCH when the network device configures the short DRX cycle for the UEs, it is just to associate one energy-saving downlink control channel information with the subsequent multiple time periods, without distinguishing between the long DRX cycle and the short DRX cycle. For example, when the sum of the durations of the N time periods is equal to a long DRX cycle, in case that the short DRX cycle is not configured, then, the states of UEs corresponding to the N time periods are all sleep state or awake state; in case that the short DRX cycle is configured, then, the states of UEs corresponding to the N time periods (that is, N short DRX cycles) may be the same or different, which is specifically determined according to whether the network device sends PDCCH data in each short DRX cycle. Therefore, the configuration of the energy-saving PDCCH monitor occasions when there is a short DRX cycle, is simple, and the purpose of an energy-saving granularity being a short DRX cycle can be achieved.

In addition, in the embodiment of the present disclosure, when configuring the search space, it is only necessary to configure the search space according to the long DRX cycle, which can achieve the purpose of indicating the short DRX cycle, and the search space can be configured easily.

The foregoing energy-saving downlink control channel information transmission method is illustrated hereinafter with the following examples.

Optionally, the step of generating energy-saving downlink control channel information used to indicate the states of UEs, includes:

in case that the states of UEs corresponding to at least one of the N time periods is the awake state, generating the energy-saving downlink control channel information used to indicate the states of UEs.

That is, in the embodiment of the present disclosure, only when the UEs need to wake up in the N time periods associated with the first energy-saving downlink control channel monitor occasion, the energy-saving downlink control channel information is generated and issued. In case that the UEs do not need to wake up in the N time periods, the energy-saving downlink control channel information is not generated and issued. For the UEs, in case that the energy-saving downlink control channel information is not detected at the first energy-saving downlink control channel monitor occasion, the UEs consider that it is in a sleep state in the subsequent N time periods.

Optionally, before the step of determining states of UEs corresponding to each of N time periods associated with a first energy-saving downlink control channel monitor occasion, the method further includes:
- determining, by the network device, first information, where the first information includes at least one of the following:
- energy-saving downlink control channel monitor occasion;
- the number N of time periods;
- time-related information of the time period;
- the number of bits occupied by energy-saving downlink control channel information of each UE;
- the number of time periods corresponding to each bit;
- function indication information related to wake-up of the UEs;
- function indication information related to sleep of the UEs.

That is, before sending the energy-saving PDCCH, the network device needs to first determine an energy-saving downlink control channel monitor occasion of each UE, as well as the number of time periods associated with the energy-saving downlink control channel monitor occasion of each UE, the time-related information of the time period (for example, at least one of a duration of the time period, a starting time, an ending time, a starting time offset, and an ending time offset), the number of bits occupied by the energy-saving downlink control channel information, and the number of time periods corresponding to each bit. In addition, the network device may further predetermine wake-up related functions and/or sleep related functions of the UEs. Specifically, wake-up related functions include, but are not limited to, bandwidth part (BWP) switching, secondary cell (Scell) activating, channel state information (CSI) report triggering, multiple-put multiple-output (MIMO) antenna configuration, channel sounding reference signal (SRS) triggering, tracking reference signal (TRS) triggering, etc.

Further optionally, the time-related information of the time period may specifically be DRX parameters, including parameters of long DRX and/or parameters of short DRX.

Optionally, after the step of determining the first information, the method further includes: issuing the first information.

Specifically, the network device may configure information contained in the first information to the UEs through high-level signaling. Specifically, the network device sends the energy-saving downlink control channel monitor occasion to the UEs, so that the UEs can detect the energy-saving PDCCH at the energy-saving downlink control channel monitor occasion configured by the network device. The network device notifies the UEs of the number of time periods associated with each energy-saving downlink control channel, so that the UEs can obtain the states of UEs in each subsequent time period according to the received energy-saving downlink control channel information. The network device notifies the UEs of the time-related information of the time period, so that the UEs can segment the following time, and determine the states of UEs in each time period according to the energy-saving downlink control channel information.

Optionally, the energy-saving downlink control channel information further includes function indication information related to wake-up of the UEs and/or function indication information related to sleep of the UEs. That is, in the embodiment of the present disclosure, the function indication information related to wake-up of the UEs and/or function indication information related to sleep of the UEs, may be carried by the energy-saving downlink control channel information. In other optional embodiments, the function indication information related to wake-up of the UEs and/or function indication information related to sleep of the UEs, may also be issued to the UEs in advance by the network device.

Optionally, each bit in the energy-saving downlink control channel information is used to indicate states of UEs corresponding to one or more time periods.

In the embodiment of the present disclosure, for a certain UE, in case that the network device allocates g bits for the UE to carry the energy-saving downlink control channel information of the UE, and one energy-saving downlink control channel monitor occasion corresponds to N time periods, then, each bit in the energy-saving downlink control channel information of the UE is used to indicate N/g time periods.

Alternatively, n bits in the energy-saving downlink control channel information are used to jointly indicate states of UEs corresponding to k time periods, n and k are integers greater than 1, and n<k≤N.

In the embodiment of the present disclosure, for a certain UE, in case that the network device allocates g bits for the UE to carry the energy-saving downlink control channel information of the UE, and one energy-saving downlink control channel monitor occasion corresponds to N time periods, then, n bits of the g bits may be used as a combination to indicate states of UEs in k time periods among the N time periods, where n may be less than g, accordingly, k is less than N; n may be equal to g, accordingly, k is equal to N. For example, 2 bits may be used to jointly indicate states of UEs of 4 time periods. When values of 2 bits are 00, it indicates that states of UEs of 4 time periods are 1000 ("1" means wake up, "0" means sleep). When the values of 2 bits are 01, it indicates that states of UEs of 4 time periods are 1100. When the values of 2 bits are 10, it indicates that states of UEs of 4 time periods are 1110. When the values of 2 bits are 11, it indicates that states of UEs of 4 time periods are 1111.

Figure 4:
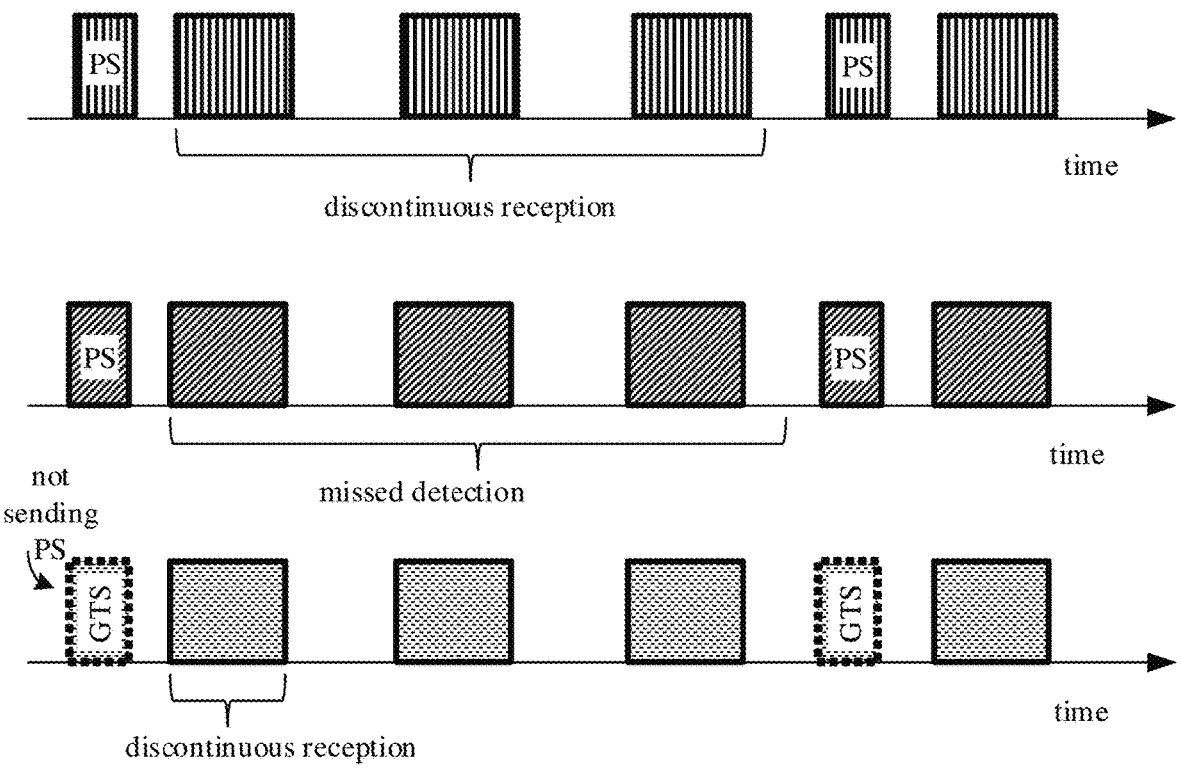
FIG. 4 is a schematic diagram showing missed detection of energy-saving downlink control channel information associated with multiple time periods according to an embodiment of the present disclosure.

In case that the UEs do not detect the energy-saving downlink control channel information at the first energy-saving downlink control channel monitor occasion, the UEs consider that it is in a sleep state in the subsequent N time periods. Then, when an energy-saving PDCCH is lost, the UEs will enter the sleep state for subsequent N consecutive time periods without performing PDCCH detection. However, in case that the lost energy-saving PDCCH indicates that the UEs wake up to perform PDCCH detection, then PDCCH data in the N time periods may be lost, which increases data delay and time-frequency resource overhead. Referring to FIG. 4, the top picture shows that the UEs detect energy-saving PDCCH information; the middle picture shows that the UEs miss an energy-saving PDCCH; the bottom picture shows that the network device does not send the energy-saving PDCCH, and the UEs do not perform detection of the energy-saving PDCCH, where PS represents an energy-saving PDCCH, and GTS represents that the network device does not send the energy-saving PDCCH at an energy-saving PDCCH monitor occasion.

In order to solve the foregoing problem, in the embodiment of the present disclosure, optionally, there is at least one second energy-saving downlink control channel monitor occasion in the N time periods.

That is, in addition to configuring an energy-saving downlink control channel monitor occasion every N time periods, the network device further configures an energy-saving downlink control channel monitor occasion in N time periods, that is, a second energy-saving downlink control channel monitor occasion. The network device may send, at the second energy-saving downlink control channel monitor occasion, an energy-saving downlink control channel information for indicating states of UEs in one or more time periods immediately after the second energy-saving downlink control channel monitor occasion. Therefore, even if the foregoing energy-saving PDCCH loss occurs, it will not cause the problem of PDCCH data loss for N consecutive time periods, and only PDCCH data in several time periods between the first energy-saving downlink control channel monitor occasion and the second energy-saving downlink control channel monitor occasion will be lost at most, thereby improving transmission reliability of the energy-saving PDCCH, so that the UEs can effectively detect and receive PDCCH data according to energy-saving PDCCH signaling of the network device. In addition, data transmission delay and the number of retransmissions can be reduced, thereby improving utilization of time-frequency resources.

In some optional embodiments of the present disclosure, after the step of issuing the energy-saving downlink control channel information at the first energy-saving downlink control channel monitor occasion, the method further includes:
  in case of issuing energy-saving downlink control channel information at the second energy-saving downlink control channel monitor occasion, obtaining states of UEs corresponding to each of N time periods associated with the second energy-saving downlink control channel monitor occasion; where the N time periods associated with the second energy-saving downlink control channel monitor occasion may specifically be N time periods immediately after the second energy-saving downlink control channel monitor occasion; and
  generating, and issuing at the second energy-saving downlink control channel monitor occasion, energy-saving downlink control channel information for indicating the states of UEs corresponding to each of N time periods associated with the second energy-saving downlink control channel monitor occasion.

Figure 5:
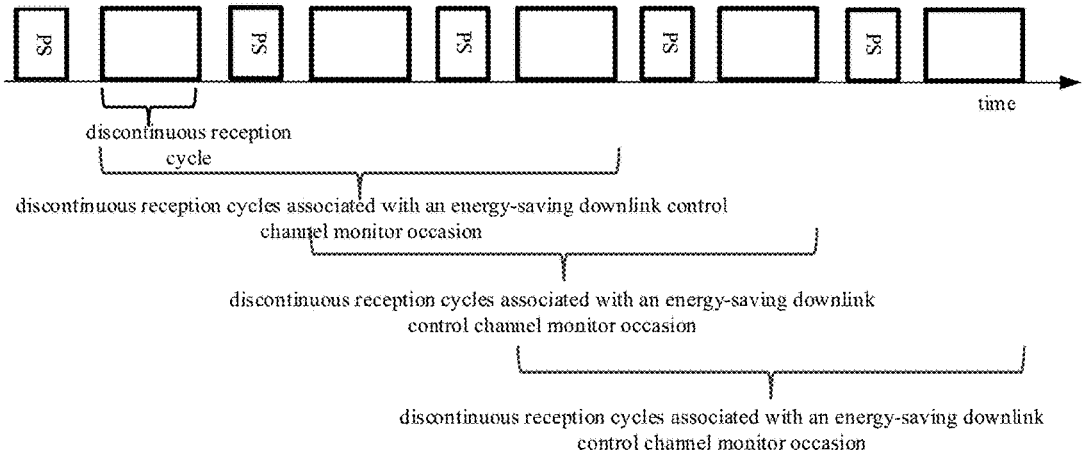
FIG. 5 is a schematic diagram showing states of UEs in a time period indicated by multiple energy-saving downlink control channel information according to an embodiment of the present disclosure.

For example, referring to FIG. 5, it is assumed that one time period corresponds to one DRX cycle (which may be a short DRX cycle or a long DRX cycle), and first energy-saving PDCCH monitor occasions (including a first PS and a fourth PS from the left in FIG. 5) correspond to subsequent 3 DRX cycles (including a first DRX cycle, a second DRX cycle and a third DRX cycle, from left to right). There is a second energy-saving PDCCH monitor occasion (i.e., a second PS and a third PS from the left in FIG. 5) before each of the second DRX cycle and the third DRX cycle. In case that the network device determines that it is necessary to issue an energy-saving PDCCH at the second energy-saving PDCCH monitor occasion, the network device obtains states of UEs corresponding to the three DRX cycles after the second energy-saving downlink control channel monitor occasion; and then generates and issues at the second energy-saving downlink control channel monitor occasion, energy-saving downlink control channel information for indicating the states of UEs corresponding to each of 3 time periods associated with the second energy-saving downlink control channel monitor occasion. In this example, each DRX cycle corresponds to 3 energy-saving PDCCH monitor occasions (i.e., one energy-saving PDCCH monitor occasion is associated with N DRX cycles, and each DRX cycle corresponds to N energy-saving PDCCH monitor occasions), that is, the states of UEs of each DRX cycle can be indicated by three energy-saving PDCCH information. From the UE side, the UEs have to wake up to receive the energy-saving PDCCH in each DRX cycle. In addition, if the last received energy-saving PDCCH indicates that the states of UEs in the current DRX cycle is awake, but no energy-saving PDCCH is detected before the current DRX cycle, the UEs will also perform a wake-up operation.

Figure 6:
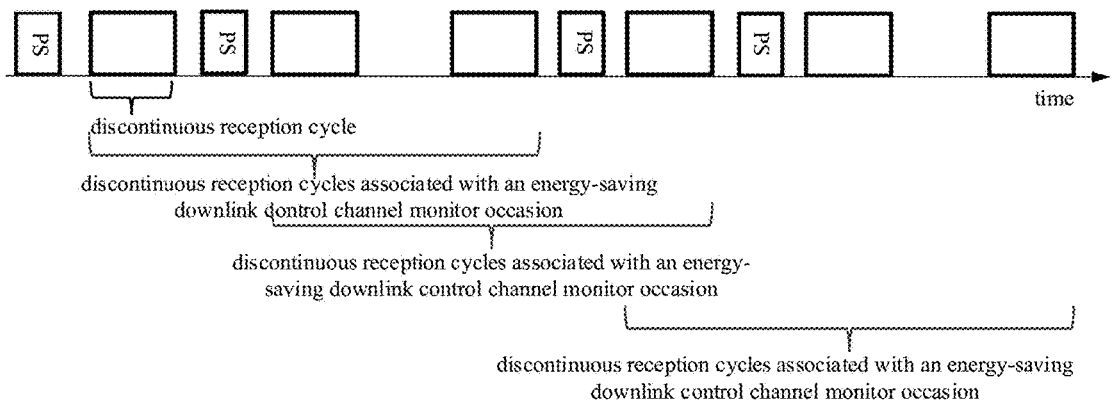
FIG. 6 is another schematic diagram showing states of UEs in a time period indicated by multiple energy-saving downlink control channel information according to an embodiment of the present disclosure.

For another example, referring to FIG. 6, it is assumed that one time period corresponds to one DRX cycle (which may be a short DRX cycle or a long DRX cycle), and first energy-saving PDCCH monitor occasions (including a first PS and a third PS from the left in FIG. 6) correspond to subsequent 3 DRX cycles (including a first DRX cycle, a second DRX cycle and a third DRX cycle, from left to right); there is a second energy-saving PDCCH monitor occasion (i.e., a second PS from the left in FIG. 5) before the second DRX cycle, and there is no second energy-saving PDCCH monitor occasion before the third DRX cycle (in case that one energy-saving PDCCH monitor occasion corresponds to 4 or more DRX cycles, there is no second energy-saving PDCCH monitor occasion before the third DRX cycle, and there is no second energy-saving PDCCH monitor occasion before the DRX cycle after the third DRX cycle). In case that the network device determines that it is necessary to issue an energy-saving PDCCH at the second energy-saving PDCCH monitor occasion, the network device obtains states of UEs corresponding to the three DRX cycles after the second energy-saving downlink control channel monitor occasion; and then generates and issues at the second energy-saving downlink control channel monitor occasion, energy-saving downlink control channel information for indicating the states of UEs corresponding to each of 3 time periods associated with the second energy-saving downlink control channel monitor occasion. In this example, each DRX cycle corresponds to 2 energy-saving PDCCH monitor occasions, that is, the states of UEs of each DRX cycle can be indicated by 2 energy-saving PDCCH information. From the UE side, if the last received energy-saving PDCCH indicates that the states of UEs in the current DRX cycle is awake, but no energy-saving PDCCH is detected before the current DRX cycle, the UEs will also perform a wake-up operation.

In the foregoing examples, the distinction between the first energy-saving downlink control channel monitor occasion and the second energy-saving downlink control channel monitor occasion is only for convenience of description, and there is no substantial difference between the two.

In other optional embodiments of the present disclosure, after the step of issuing the energy-saving downlink control channel information at the first energy-saving downlink control channel monitor occasion, the method further includes:
  in case of issuing energy-saving downlink control channel information at the second energy-saving downlink control channel monitor occasion, obtaining states of UEs corresponding to each of time periods, which are in the N time periods and are after the second energy-saving downlink control channel monitor occasion;
  generating, and issuing at the second energy-saving downlink control channel monitor occasion, energy-saving downlink control channel information for indicating the states of UEs corresponding to each of time periods, which are in the N time periods and are after the second energy-saving downlink control channel monitor occasion.

Figure 7:
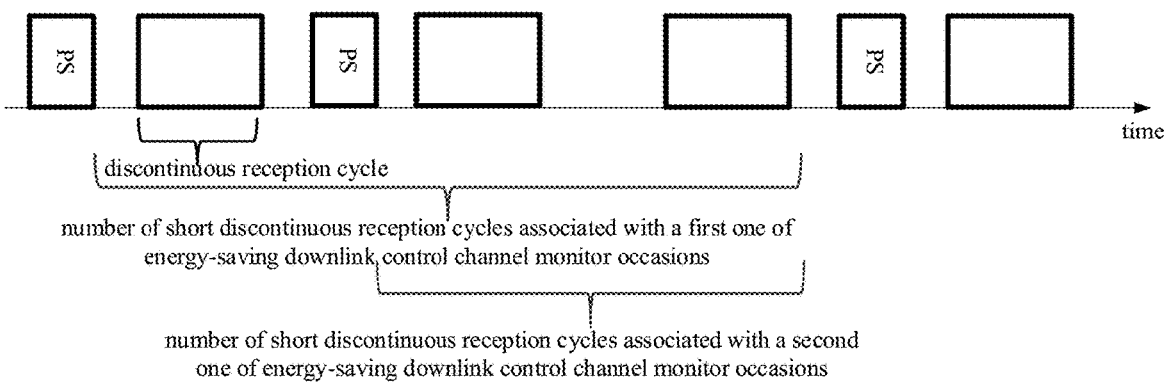
FIG. 7 is another schematic diagram showing states of UEs in a time period indicated by multiple energy-saving downlink control channel information according to an embodiment of the present disclosure.

For example, referring to FIG. 7, it is assumed that one time period corresponds to one DRX cycle (which may be a short DRX cycle or a long DRX cycle), and first energy-saving PDCCH monitor occasions (including a first PS and a third PS from the left in FIG. 7) correspond to subsequent 3 DRX cycles (including a first DRX cycle, a second DRX cycle and a third DRX cycle, from left to right); there is a second energy-saving PDCCH monitor occasion (i.e., a second PS from the left in FIG. 7) before the second DRX cycle, and there is no second energy-saving PDCCH monitor occasion before the third DRX cycle (or, there is a second energy-saving PDCCH monitor occasion before the third DRX cycle, and there is no second energy-saving PDCCH monitor occasion before the second DRX cycle). In case that the network device determines that it is necessary to issue an energy-saving PDCCH at the second energy-saving PDCCH monitor occasion, the network device obtains states of UEs corresponding to two DRX cycles (including the second DRX cycle and the third DRX cycle), which are of the first DRX cycle, the second DRX cycle and the third DRX cycle, and are after the second energy-saving downlink control channel monitor occasion; and then generates and issues at the second energy-saving downlink control channel monitor occasion, energy-saving downlink control channel information for indicating the states of UEs corresponding to each of time periods, which are in the 3 time periods and are after the second energy-saving downlink control channel monitor occasion. In this example, only part of the DRX cycles corresponds to 2 energy-saving PDCCH monitor occasions, that is, the states of UEs of the part of the DRX cycles can be indicated by 2 energy-saving PDCCH information. From the UE side, if the last received energy-saving PDCCH indicates that the states of UEs in the current DRX cycle is awake, but no energy-saving PDCCH is detected before the current DRX cycle, the UEs will also perform a wake-up operation.

In the embodiment of the present disclosure, one energy-saving PDCCH monitor occasion corresponds to N time periods, and the time periods corresponding to two or more adjacent energy-saving PDCCH monitor occasions overlap. That is, the states of UEs in one time period may be indicated by two or more energy-saving PDCCHs, which can avoid situations that when one energy-saving PDCCH is lost, the UEs mistakenly enter the sleep state for N consecutive time periods.

Further, optionally, the energy-saving downlink control channel information transmission method further includes:
  after sending the energy-saving downlink control channel information last time, in case that no indication information for indicating that the UEs have received the energy-saving downlink control channel information sent last time, determining that it is necessary to issue energy-saving downlink control channel information at the second energy-saving downlink control channel monitor occasion.

That is, in the embodiment of the present disclosure, the network device configures two or more energy-saving downlink control channel monitor occasions for N time periods (to prevent loss of PDCCH data in consecutive N time periods due to the loss of energy-saving PDCCH), but it is not necessary to issue the energy-saving PDCCH at each energy-saving downlink control channel monitor occasion. For the energy-saving downlink control channel monitor occasions located between N time periods, the energy-saving PDCCH needs to be issued only when it is determined that the UEs may have lost the energy-saving PDCCH that the network device sent last time. For example, whether the indication information for indicating that the UEs have received the energy-saving downlink control channel information sent last time, is received, can be used to determine whether the UEs have received the energy-saving PDCCH sent last time. In case that it is determined that the UEs have received the energy-saving PDCCH sent last time, there is no need to issue the energy-saving PDCCH at the second energy-saving downlink control channel monitor occasion.

In the embodiment of the present disclosure, in case that the UEs do not receive the energy-saving PDCCH, the UEs will only sleep in one time period or part of the N time periods.

Specifically, the indication information for indicating that the UEs have received the energy-saving downlink control channel information sent last time, may be an acknowledgement (ACK) or a negative acknowledge (NACK). The acknowledgement or the negative acknowledge is sent by the UEs for a detection result of a downlink control channel detection performed after the UEs wake up.

In the embodiment of the present disclosure, in case that the UEs do not detect the energy-saving downlink control channel information at the current energy-saving downlink control channel monitor occasion, the UEs consider that it is in a sleep state in the subsequent N time periods. Therefore, the network device may send the energy-saving PDCCH only when it needs to wake up the UEs (that is, the states of UEs corresponding to at least one of the subsequent N time periods is the awake state); when the UEs wake up and performs PDCCH detection according to the currently received energy-saving PDCCH, the UEs will feedback ACK or NACK for a detection result of scheduling data (i.e., PDCCH data). Therefore, in case that the network device receives ACK or NACK feedback, it means that the UEs have woken up for performing PDCCH detection (that is, the UEs receive a downlink control channel defined by DRX function during a DRX active period), which means that the UEs have received the energy-saving PDCCH sent last time, i.e., the energy-saving PDCCH indicating the DRX cycle where the ACK/NACK is located. In case that the network device does not receive ACK or NACK feedback, it means that the UEs probably do not wake up to perform PDCCH detection according to the energy-saving PDCCH sent last time, which means that the UEs probably do not receive the energy-saving PDCCH sent by the network device last time.

Optionally, before the step of obtaining states of UEs corresponding to each of time periods, which are in the N time periods and are after the second energy-saving downlink control channel monitor occasion, the method further includes:
  in case that the states of UEs corresponding to at least one of time periods, which are in the N time periods and are after the second energy-saving downlink control channel monitor occasion, is the wake-up state, determining that it is necessary to issue energy-saving downlink control channel information at the second energy-saving downlink control channel monitor occasion.

That is, the energy-saving downlink control channel information may be sent only when the UEs need to wake up in one of time periods, which are in the N time periods and are after the second energy-saving downlink control channel monitor occasion; otherwise, the energy-saving downlink control channel information may not be issued. That is, in case that the states of UEs corresponding to each of time periods, which are in the N time periods and are after the second energy-saving downlink control channel monitor occasion, is the sleep state, the energy-saving downlink control channel information may not be issued. For a certain time period, in case that the UEs do not receive an energy-saving PDCCH indicating a wake-up state, it is considered to be in the sleep state. Since the probability that the UEs fail to detect the energy-saving PDCCH twice in succession is extremely low, even if the UEs miss the energy-saving PDCCH sent last time, in case that the states of UEs corresponding to the time periods associated with the energy-saving PDCCH time (i.e., time periods, which are in the N time periods and are after the second energy-saving downlink control channel monitor occasion) are the sleep state, the energy-saving downlink control channel information may not be issued.

Referring to FIG. 8, FIG. 8 is a schematic flowchart of an energy-saving downlink control channel information transmission method according to a second embodiment of the present disclosure. The method is performed by a UE and includes the following steps.

Step 801: receiving, by the UE, energy-saving downlink control channel information at a first energy-saving downlink control channel monitor occasion;

Step 802: according to the received energy-saving downlink control channel information, determining, by the UE, a state of the UE corresponding to each of N time periods associated with the first energy-saving downlink control channel monitor occasion; where the state of the UE includes an awake state or a sleep state.

In the embodiment of the present disclosure, the network device may be a base station; the first energy-saving downlink control channel monitor occasion may be a current energy-saving downlink control channel monitor occasion; and the N time periods may be multiple consecutive time periods immediately following the current energy-saving downlink control channel monitor occasion.

In the embodiment of the present disclosure, one energy-saving downlink control channel information may indicate the states of the UE corresponding to the subsequent multiple time periods, thereby reducing power consumption of the UE. In addition, compared with the solution in which one energy-saving downlink control channel information can indicate states of UEs only for one time period, the present application can not only save time-frequency resource overhead, reduce a blind detection frequency of the energy-saving PDCCH and thus save more energy, and the UE does not need to wake up constantly to detect the energy-saving PDCCH, which is convenient for the UE to enter a deep sleep state.

Optionally, a sum of durations of the N time periods is equal to at least one long discontinuous reception cycle (that is, the long DRX cycle) of UE, and one time period is equal to one short discontinuous reception cycle (that is, the short DRX cycle) of the UE.

In the embodiment of the present disclosure, the network device may configure the PDCCH search space according to the long DRX cycle, which can achieve the purpose of saving energy in the short DRX cycle. When the UE performs energy-saving PDCCH detection, it does not need to know information about a length of the DRX cycle, and the detection algorithm is simple. In addition, from the UE side, one energy-saving PDCCH indicates states of UEs of multiple DRX cycles (either a long DRX cycle or a short DRX cycle), that is, the UE can know the sleep state and wake-up state, multiple DRX cycles in advance, so that the UE can skip the energy-saving PDCCH detection before multiple DRX cycles; especially before the DRX cycle in which the energy-saving PDCCH indicates a sleep state, the UE does not perform the energy-saving PDCCH detection, which facilitates the UE to enter the deep sleep state and further saves the energy consumption of the UE.

The foregoing energy-saving downlink control channel information transmission method is illustrated hereinafter with the following examples.

Optionally, before the step of receiving energy-saving downlink control channel information at the first energy-saving downlink control channel monitor occasion, the method further includes:
receiving first information, where the first information includes at least one of the following:
energy-saving downlink control channel monitor occasion;
the number N of time periods;
time-related information of the time period;
the number of bits occupied by energy-saving downlink control channel information of each UE;
the number of time periods corresponding to each bit;
function indication information related to wake-up of the UEs;
function indication information related to sleep of the UEs.

Specifically, the network device may configure information contained in the first information to the UE through high-level signaling. That is, the UE may receive the foregoing information indicated by the network device through high-level signaling.

In the embodiment of the present disclosure, in case that the network device allocates only one bit to a certain UE to carry the energy-saving downlink control channel information of the UE, then the UEs have been awake or has been in sleep in N time periods associated with the energy-saving downlink control channel information.

Optionally, before the step of according to the received energy-saving downlink control channel information, determining states of UEs corresponding to each of N time periods associated with the first energy-saving downlink control channel monitor occasion, the method further includes:
determining the number N of the time periods according to a time interval between two adjacent energy-saving downlink control channel monitor occasions and a duration of the time period; and/or,
determining the number of time periods corresponding to each bit according to the time interval between two adjacent energy-saving downlink control channel monitor occasions, the duration of the time period, and the number of bits occupied by the energy-saving downlink control channel information of the UE.

That is, the network device may not explicitly indicate to the UE the number N of time periods (the first information may not include the number N of time periods) and/or the number of time periods corresponding to each bit. After obtaining the time interval between two adjacent energy-saving downlink control channel monitor occasions, the UE divides the time interval between two adjacent energy-saving downlink control channel monitor occasions by the duration of the time period to obtain the number N of time periods; and the UE divides the number N of time periods by the number of bits occupied by the energy-saving downlink control channel information of the UE to obtain the number of time periods corresponding to each bit. In addition, in case that the network device explicitly indicates to the UE the number N of time periods, the UE can directly divide the number N of time periods by the number of bits occupied by the energy-saving downlink control channel information of the UE to obtain the number of time periods corresponding to each bit.

After the step of according to the received energy-saving downlink control channel information, determining states of UEs corresponding to each of N time periods associated with the first energy-saving downlink control channel monitor occasion, the method further include:

waking up in the time period determined to be in the wake-up state to perform downlink control channel detection;

sending an acknowledgement (ACK) or a negative acknowledge (NACK) for a detection result.

In addition, optionally, there is a second energy-saving downlink control channel monitor occasion between at least two adjacent time periods in the N time periods.

In the embodiment of the present disclosure, in case that the UE does not receive the energy-saving PDCCH, the UE will only sleep in one time period or part of the N time periods. For example, in case that the UE does not receive an energy-saving PDCCH at the first energy-saving downlink control channel monitor occasion, then the UEs wake up at a first one of second energy-saving downlink control channel monitor occasions to perform energy-saving PDCCH detection. When there are two or more second energy-saving downlink control channel monitor occasions, in case that the energy-saving PDCCH is not detected in a previous second energy-saving downlink control channel monitor occasion, then the UEs wake up at a current second energy-saving downlink control channel monitor occasion to perform energy-saving PDCCH detection.

Optionally, after the step of according to the received energy-saving downlink control channel information, determining states of UEs corresponding to each of N time periods associated with the first energy-saving downlink control channel monitor occasion, the method further includes:

in case that there is a second energy-saving downlink control channel monitor occasion between a first time period and a second time period which are adjacent in the N time periods, and the states of UEs corresponding to the second time period is the sleep state, keeping or entering the sleep state at the second energy-saving downlink control channel monitor occasion.

That is, in case that the energy-saving PDCCH is received to indicate that the states of UEs corresponding to a certain time period is the sleep state, the UE may not perform energy-saving PDCCH detection at an energy-saving downlink control channel monitor occasion immediately before the certain time period.

It should be noted that this embodiment is an implementation on the UE side corresponding to the foregoing first embodiment, and the specific implementation may refer to the relevant description of the first embodiment, which is not repeated in this embodiment to avoid repeated description, and the same beneficial effect can also be achieved.

Referring to FIG. 9, FIG. 9 is a schematic diagram of a network device according to a third embodiment of the present disclosure. As shown in FIG. 9, the network device 900 includes:

a state determining module 901 configured to determine states of UEs corresponding to each of N time periods associated with a first energy-saving downlink control channel monitor occasion; where the states of UEs includes an awake state and a sleep state;

an information generating module 902 configured to generate energy-saving downlink control channel information used to indicate the states of UEs;

an information issuing module 903 configured to issue the energy-saving downlink control channel information at the first energy-saving downlink control channel monitor occasion.

Optionally, the information generating module 902 is configured to, in case that the states of UEs corresponding to at least one of the N time periods is the awake state, generate the energy-saving downlink control channel information used to indicate the states of UEs.

Optionally, the network device further includes:

an information determining module configured to determine first information, where the first information includes at least one of the following:

energy-saving downlink control channel monitor occasion;

the number N of time periods;

time-related information of the time period;

the number of bits occupied by energy-saving downlink control channel information of each UE;

the number of time periods corresponding to each bit;

function indication information related to wake-up of the UEs;

function indication information related to sleep of the UEs.

Optionally, each bit in the energy-saving downlink control channel information is used to indicate states of UEs corresponding to one or more time periods.

Alternatively, n bits in the energy-saving downlink control channel information are used to jointly indicate states of UEs corresponding to k time periods, n and k are integers greater than 1, and n<k≤N.

Optionally, a sum of durations of the N time periods is equal to at least one long discontinuous reception cycle of the UEs, and one time period is equal to one short discontinuous reception cycle of the UEs.

Optionally, there is at least one second energy-saving downlink control channel monitor occasion in the N time periods.

Optionally, the network device further includes:

a first state obtaining module configured to, in case of issuing energy-saving downlink control channel information at the second energy-saving downlink control channel monitor occasion, obtain states of UEs corresponding to each of N time periods associated with the second energy-saving downlink control channel monitor occasion;

a first generating and issuing module configured to generate and issue at the second energy-saving downlink control channel monitor occasion, energy-saving downlink control channel information for indicating the states of UEs corresponding to each of N time periods associated with the second energy-saving downlink control channel monitor occasion.

Optionally, the network device further includes:

a second state obtaining module configured to, in case of issuing energy-saving downlink control channel information at the second energy-saving downlink control channel monitor occasion, obtain states of UEs corresponding to each of time periods, which are in the N time periods and are after the second energy-saving downlink control channel monitor occasion;

a second generating and issuing module configured to generate and issue at the second energy-saving downlink control channel monitor occasion, energy-saving downlink control channel information for indicating the states of UEs corresponding to each of time periods, which are in the N time periods and are after the second energy-saving downlink control channel monitor occasion.

Optionally, the network device further includes:

a first information-issuing determining module configured to, after sending the energy-saving downlink control channel information last time, in case that no indication information for indicating that the UEs have received the energy-saving downlink control channel information sent last time, determine that it is necessary to issue energy-saving downlink control channel information at the second energy-saving downlink control channel monitor occasion.

Optionally, the indication information for indicating that the UEs have received the energy-saving downlink control channel information sent last time, may be an acknowledgement (ACK) or a negative acknowledge (NACK). The acknowledgement or the negative acknowledge is sent by the UEs for a detection result of a downlink control channel detection performed after the UEs wake up.

Optionally, the network device further includes:

a second information-issuing determining module configured to, in case that the states of UEs corresponding to at least one of time periods, which are in the N time periods and are after the second energy-saving downlink control channel monitor occasion, is the wake-up state, determine that it is necessary to issue energy-saving downlink control channel information at the second energy-saving downlink control channel monitor occasion.

It should be noted that the foregoing network device 900 in this embodiment may be the network device in any implementation manner in the method embodiments of the present disclosure, and any implementation manner of the network device in the method embodiments of the present disclosure can be implemented by the foregoing network device 900 in this embodiment with the same beneficial effects being achieved, which will not be repeated here.

Figure 10:
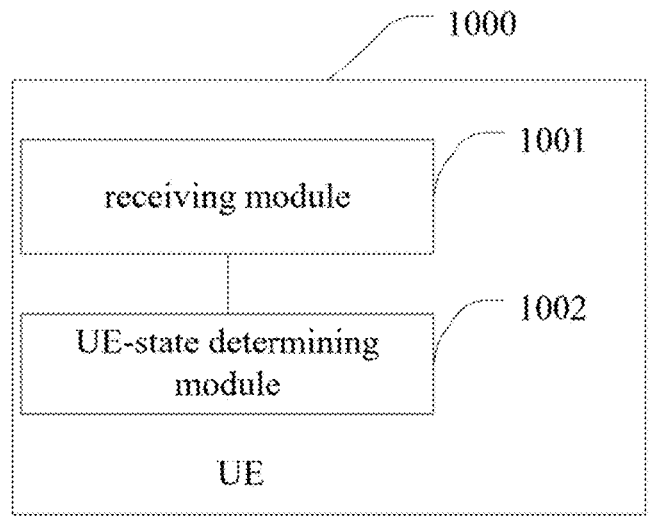
FIG. 10 is a schematic diagram of a UE according to a fourth embodiment of the present disclosure.

Referring to FIG. 10, FIG. 10 is a schematic diagram of a UE according to a fourth embodiment of the present disclosure. As shown in FIG. 10, a UE 1000 includes:

a receiving module 1001 configured to receive energy-saving downlink control channel information at a first energy-saving downlink control channel monitor occasion; and a UE-state determining module 1002 configured to, according to the received energy-saving downlink control channel information, determine a state of the UE corresponding to each of N time periods associated with the first energy-saving downlink control channel monitor occasion; where the state of the UE includes an awake state or a sleep state.

Optionally, the UE further includes:

a first information receiving module configured to receive first information, where the first information includes at least one of the following:

energy-saving downlink control channel monitor occasion;

the number N of time periods;

time-related information of the time period;

the number of bits occupied by energy-saving downlink control channel information of each UE;

the number of time periods corresponding to each bit;

function indication information related to wake-up of the UEs;

function indication information related to sleep of the UEs.

Optionally, the UE further includes:

a first determining module configured to determine the number N of the time periods according to a time interval between two adjacent energy-saving downlink control channel monitor occasions and a duration of the time period; and/or, a second determining module configured to determine the number of time periods corresponding to each bit according to the time interval between two adjacent energy-saving downlink control channel monitor occasions, the duration of the time period, and the number of bits occupied by the energy-saving downlink control channel information of the UE.

Optionally, the UE further includes:

a state switching module configured to, in case that there is a second energy-saving downlink control channel monitor occasion between a first time period and a second time period which are adjacent in the N time periods, and the states of UEs corresponding to the second time period is the sleep state, keep or enter the sleep state at the second energy-saving downlink control channel monitor occasion.

It should be noted that the foregoing UE 1000 in this embodiment may be the UE in any implementation manner in the method embodiments of the present disclosure, and any implementation manner of the UE in the method embodiments of the present disclosure can be implemented by the foregoing UE 1000 in this embodiment with the same beneficial effects being achieved, which will not be repeated here.

Figure 11:
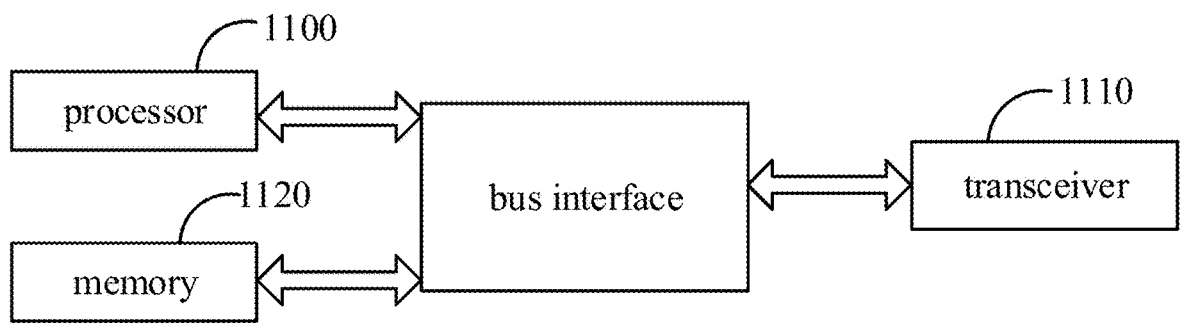
FIG. 11 is a schematic diagram of a network device according to a fifth embodiment of the present disclosure.

Referring to FIG. 11, FIG. 11 is a schematic diagram of a network device according to a fifth embodiment of the present disclosure. As shown in FIG. 11, the network device includes a transceiver 1110, a memory 1120, a processor 1100, and a computer program stored on the memory 1120 and executable on the processor. The processor 1100 executes the computer program to perform the following steps:

determining states of UEs corresponding to each of N time periods associated with a first energy-saving downlink control channel monitor occasion; where the states of UEs includes an awake state and a sleep state;

generating energy-saving downlink control channel information used to indicate the states of UEs;

issuing the energy-saving downlink control channel information at the first energy-saving downlink control channel monitor occasion.

The transceiver 1110 may be used to receive and send data under the control of the processor 1100.

In FIG. 11, a bus architecture may include any number of interconnected buses and bridges. Specifically, various circuits of one or more processors, which are represented by the processor 1100, and the memory, which is represented by the memory 1120, are linked together. The bus architecture may link various other circuits, such as a peripheral device, voltage regulator and a power management circuit together. These features are well known in this field, therefore, the present disclosure does not make further description on these features. The bus interface provides an interface. The transceiver 1110 may be multiple elements, including a transmitter and a receiver and provide units, which communicate with other devices on the transmission medium.

The processor 1100 is responsible for managing the bus architecture and common processing and the memory 1120 may store data used by the processor 1100 when executing the operations.

It should be noted that the memory 1120 is not limited to being only on the network device, and the memory 1120 and the processor 1100 may be separated in different geographic locations.

Optionally, the processor 1100 may execute the computer program to perform the following steps:

when generating energy-saving downlink control channel information used to indicate the states of UEs, in case that the states of UEs corresponding to at least one of the N time periods is the awake state, generating the energy-saving downlink control channel information used to indicate the states of UEs.

Optionally, the processor 1100 may execute the computer program to perform the following steps:

before determining states of UEs corresponding to each of N time periods associated with a first energy-saving downlink control channel monitor occasion, determining first information, where the first information includes at least one of the following:

energy-saving downlink control channel monitor occasion;

the number N of time periods;

time-related information of the time period;

the number of bits occupied by energy-saving downlink control channel information of each UE;

the number of time periods corresponding to each bit;

function indication information related to wake-up of the UEs;

function indication information related to sleep of the UEs.

Optionally, the energy-saving downlink control channel information further includes function indication information related to wake-up of the UEs and/or function indication information related to sleep of the UEs.

Optionally, each bit in the energy-saving downlink control channel information is used to indicate states of UEs corresponding to one or more time periods.

Alternatively, n bits in the energy-saving downlink control channel information are used to jointly indicate states of UEs corresponding to k time periods, n and k are integers greater than 1, and n<k≤N.

Optionally, a sum of durations of the N time periods is equal to at least one long discontinuous reception cycle of the UEs, and one time period is equal to one short discontinuous reception cycle of the UEs.

Optionally, there is at least one second energy-saving downlink control channel monitor occasion in the N time periods.

Optionally, the processor 1100 may execute the computer program to perform the following steps:

after issuing the energy-saving downlink control channel information at the first energy-saving downlink control channel monitor occasion, in case of issuing energy-saving downlink control channel information at the second energy-saving downlink control channel monitor occasion, obtaining states of UEs corresponding to each of N time periods associated with the second energy-saving downlink control channel monitor occasion; and generating, and issuing at the second energy-saving downlink control channel monitor occasion, energy-saving downlink control channel information for indicating the states of UEs corresponding to each of N time periods associated with the second energy-saving downlink control channel monitor occasion.

Optionally, the processor 1100 may execute the computer program to perform the following steps:

after issuing the energy-saving downlink control channel information at the first energy-saving downlink control channel monitor occasion, in case of issuing energy-saving downlink control channel information at the second energy-saving downlink control channel monitor occasion, obtaining states of UEs corresponding to each of time periods, which are in the N time periods and are after the second energy-saving downlink control channel monitor occasion;

generating, and issuing at the second energy-saving downlink control channel monitor occasion, energy-saving downlink control channel information for indicating the states of UEs corresponding to each of time periods, which are in the N time periods and are after the second energy-saving downlink control channel monitor occasion.

Optionally, the processor 1100 may execute the computer program to perform the following steps:

after sending the energy-saving downlink control channel information last time, in case that no indication information for indicating that the UEs have received the energy-saving downlink control channel information sent last time, determining that it is necessary to issue energy-saving downlink control channel information at the second energy-saving downlink control channel monitor occasion.

Optionally, the indication information for indicating that the UEs have received the energy-saving downlink control channel information sent last time, may be an acknowledgement (ACK) or a negative acknowledge (NACK). The acknowledgement or the negative acknowledge is sent by the UEs for a detection result of a downlink control channel detection performed after the UEs wake up.

Optionally, the processor 1100 may execute the computer program to perform the following steps:

in case that the states of UEs corresponding to at least one of time periods, which are in the N time periods and are after the second energy-saving downlink control channel monitor occasion, is the wake-up state, determining that it is necessary to issue energy-saving downlink control channel information at the second energy-saving downlink control channel monitor occasion.

It should be noted that the foregoing network device in this embodiment may be the network device in any implementation manner in the method embodiments of the present disclosure, and any implementation manner of the network device in the method embodiments of the present disclosure can be implemented by the foregoing network device in this embodiment with the same beneficial effects being achieved, which will not be repeated here.

Figure 12:
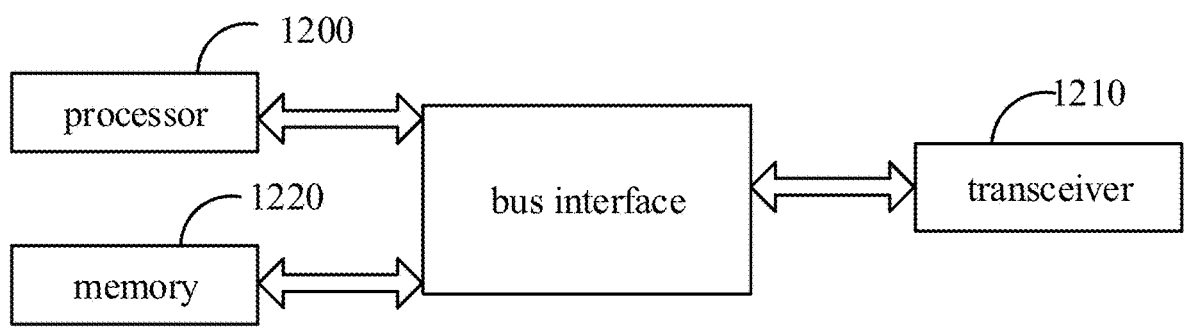
FIG. 12 is a schematic diagram of a UE according to a sixth embodiment of the present disclosure.

Referring to FIG. 12, FIG. 12 is a schematic diagram of a UE according to a sixth embodiment of the present disclosure. As shown in FIG. 12, the UE includes: a transceiver 1210, a memory 1220, a processor 1200, and a computer program stored on the memory 1220 and executable on the processor 1200. The processor 1100 may execute the computer program to perform the following steps:

receiving energy-saving downlink control channel information at a first energy-saving downlink control channel monitor occasion;

according to the received energy-saving downlink control channel information, determining states of UEs corresponding to each of N time periods associated with the first energy-saving downlink control channel monitor occasion; where the states of UEs includes an awake state and a sleep state.

The transceiver 1210 may be used to receive and send data under the control of the processor 1200.

In FIG. 12, a bus architecture may include any number of interconnected buses and bridges. Specifically, various circuits of one or more processors, which are represented by the processor 1200, and the memory, which is represented by the memory 1220, are linked together. The bus architecture may link various other circuits, such as a peripheral device, voltage regulator and a power management circuit together. These features are well known in this field, therefore, the present disclosure does not make further description on these features. The bus interface provides an interface. The transceiver 1210 may be multiple elements, including a transmitter and a receiver and provide units, which communicate with other devices on the transmission medium.

The processor 1200 is responsible for managing the bus architecture and common processing and the memory 1220 may store data used by the processor 1200 when executing the operations.

It should be noted that the memory 1220 is not limited to being only on the UE, and the memory 1220 and the processor 1200 may be separated in different geographic locations.

Optionally, the processor 1200 may execute the computer program to perform the following steps:
  before receiving energy-saving downlink control channel information at the first energy-saving downlink control channel monitor occasion,
  receiving first information, where the first information includes at least one of the following:
  energy-saving downlink control channel monitor occasion;
  the number N of time periods;
  time-related information of the time period;
  the number of bits occupied by energy-saving downlink control channel information of each UE;
  the number of time periods corresponding to each bit;
  function indication information related to wake-up of the UEs;
  function indication information related to sleep of the UEs.

Optionally, the processor 1200 may execute the computer program to perform the following steps:
  before, according to the received energy-saving downlink control channel information, determining states of UEs corresponding to each of N time periods associated with the first energy-saving downlink control channel monitor occasion,
  determining the number N of the time periods according to a time interval between two adjacent energy-saving downlink control channel monitor occasions and a duration of the time period; and/or,
  determining the number of time periods corresponding to each bit according to the time interval between two adjacent energy-saving downlink control channel monitor occasions, the duration of the time period, and the number of bits occupied by the energy-saving downlink control channel information of the UE.

Optionally, the processor 1200 may execute the computer program to perform the following steps:
  after, according to the received energy-saving downlink control channel information, determining states of UEs corresponding to each of N time periods associated with the first energy-saving downlink control channel monitor occasion,
  in case that there is a second energy-saving downlink control channel monitor occasion between a first time period and a second time period which are adjacent in the N time periods, and the states of UEs corresponding to the second time period is the sleep state, keeping or entering the sleep state at the second energy-saving downlink control channel monitor occasion.

It should be noted that the foregoing UE in this embodiment may be the UE in any implementation manner in the method embodiments of the present disclosure, and any implementation manner of the UE in the method embodiments of the present disclosure can be implemented by the foregoing UE in this embodiment with the same beneficial effects being achieved, which will not be repeated here.

One embodiment of the present disclosure further provides a computer-readable storage medium including a computer program stored thereon. The computer program is executed by a processor to perform the steps of the energy-saving downlink control channel information transmission method on the network device side provided by the embodiment of the present disclosure, or the steps of the energy-saving downlink control channel information transmission method on the UE side provided by the embodiment of the present disclosure.

In the embodiments provided in the present disclosure, it should be understood that the disclosed devices and methods may be implemented in other ways. For example, the device embodiments described above are only an example. For example, division of units is only logical function division. There may be other division manners in actual implementation, for example, multiple units or components may be combined or integrated into another system, or some features may be ignored or not implemented. In addition, the mutual coupling, direct coupling, or communication connection shown or discussed may be indirect coupling or communication connection through some interfaces, apparatuses, or units, and may be in electrical, mechanical, or other forms.

In addition, various functional units in various embodiments of the present disclosure may be integrated into one processing unit, or each unit may be physically included individually, or two or more units may be integrated into one unit. The foregoing integrated units may be implemented in the form of hardware, or may be implemented in the form of hardware plus software functional units.

The foregoing integrated units implemented in the form of software functional units may be stored in a computer-readable storage medium. The foregoing software functional unit stored in a storage medium, includes several instructions to cause a computer device (which may be a personal computer, a server, or a network device, etc.) to execute part of steps of the energy-saving downlink control channel information transmission method described in various embodiments of the present disclosure. The foregoing storage medium includes: a U disk, a mobile hard disk, a read-only memory (ROM), a random access memory (RAM), a magnetic disk or an optical disk and other media that can store program codes.

It can be understood that those embodiments described in the embodiments of the present disclosure may be implemented by hardware, software, firmware, middleware, microcode, or a combination thereof. For implementation with hardware, units, modules, sub-units and sub-modules may be implemented in one or more application specific integrated circuits (ASIC), a digital signal processor (DSP), a digital signal processing device (DSP Device, DSPD), a programmable logic device (PLD), a field-programmable gate array (PFGA), a general processor, a controller, a micro-controller, a microprocessor, another electronic unit for implementing the functions of the present disclosure, or their combinations.

For implementation by software, technologies described in the embodiments of the present disclosure may be implemented by executing functional modules (for example, a process and a function) in the embodiments of the present disclosure. Software codes can be stored in the memory and executed by the processor. The memory can be implemented inside or outside the processor.

The above are optional embodiments of the present disclosure. It should be pointed out that, for persons having ordinary skill in the art, several improvements and changes may be made, without departing from the principle of the present disclosure. These improvements and changes should also be within the scope of the present disclosure.

What is claimed is:

1. An energy-saving downlink control channel information transmission method, comprising:
   determining states of UEs corresponding to each of N time periods associated with a first energy-saving downlink control channel monitor occasion; wherein the states of UEs includes an awake state and a sleep state;
   generating energy-saving downlink control channel information used to indicate the states of UEs; and
   issuing the energy-saving downlink control channel information at the first energy-saving downlink control channel monitor occasion,
   wherein time-related information of the N time periods is DRX parameters, including parameters of long DRX and/or parameters of short DRX,
   each bit in the energy-saving downlink control channel information is used to indicate states of UEs corresponding to one or more of the N time periods; or,
   n bits in the energy-saving downlink control channel information are used to jointly indicate states of UEs corresponding to k of the N time periods, wherein n and k are integers greater than 1, and n<k≤N.

2. The method according to claim 1, wherein the generating energy-saving downlink control channel information used to indicate the states of UEs, includes:
   in case that the states of UEs corresponding to at least one of the N time periods is the awake state, generating the energy-saving downlink control channel information used to indicate the states of UEs.

3. The method according to claim 1, wherein before determining the states of UEs corresponding to each of N time periods associated with a first energy-saving downlink control channel monitor occasion, the method further includes:
   determining first information, wherein the first information includes at least one of the following:
   energy-saving downlink control channel monitor occasion;
   the number N of the N time periods associated with the first energy-saving downlink control channel monitor occasion;
   the time-related information of the N time periods;
   the number of bits occupied by energy-saving downlink control channel information of each UE;
   the number of time periods corresponding to each bit of n bits;
   function indication information related to wake-up of the UEs;
   function indication information related to sleep of the UEs.

4. The method according to claim 1, wherein the energy-saving downlink control channel information further includes function indication information related to wake-up of the UEs and/or function indication information related to sleep of the UEs.

5. The method according to claim 1, wherein a sum of durations of the N time periods is equal to at least one long discontinuous reception cycle of the UEs, and one time period is equal to one short discontinuous reception cycle of the UEs.

6. The method according to claim 1, wherein there is at least one second energy-saving downlink control channel monitor occasion in the N time periods.

7. The method according to claim 6, wherein after issuing the energy-saving downlink control channel information at the first energy-saving downlink control channel monitor occasion, the method further includes:
   in case of issuing energy-saving downlink control channel information at the second energy-saving downlink control channel monitor occasion, obtaining states of UEs corresponding to each of N time periods associated with the second energy-saving downlink control channel monitor occasion; and
   generating, and issuing at the second energy-saving downlink control channel monitor occasion, energy-saving downlink control channel information for indicating the states of UEs corresponding to each of N time periods associated with the second energy-saving downlink control channel monitor occasion.

8. The method according to claim 6, wherein after issuing the energy-saving downlink control channel information at the first energy-saving downlink control channel monitor occasion, the method further includes:
   in case of issuing energy-saving downlink control channel information at the second energy-saving downlink control channel monitor occasion, obtaining states of UEs corresponding to each of time periods, which are in the N time periods and are after the second energy-saving downlink control channel monitor occasion;
   generating, and issuing at the second energy-saving downlink control channel monitor occasion, energy-saving downlink control channel information for indicating the states of UEs corresponding to each of time periods, which are in the N time periods and are after the second energy-saving downlink control channel monitor occasion.

9. The method according to claim 7, wherein the method further includes:
   after sending the energy-saving downlink control channel information last time, in case that no indication information for indicating that the UEs have received the energy-saving downlink control channel information sent last time, determining that it is necessary to issue energy-saving downlink control channel information at the second energy-saving downlink control channel monitor occasion;
   wherein the indication information for indicating that the UEs have received the energy-saving downlink control channel information sent last time, is an acknowledgement (ACK) or a negative acknowledge (NACK); the acknowledgement or the negative acknowledge is sent by the UEs for a detection result of a downlink control channel detection performed after the UEs wake up.

10. The method according to claim 8, wherein the method further includes:
in case that the states of UEs corresponding to at least one of time periods, which are in the N time periods and are after the second energy-saving downlink control channel monitor occasion, is the awake state, determining that it is necessary to issue energy-saving downlink control channel information at the second energy-saving downlink control channel monitor occasion.

11. An energy-saving downlink control channel information transmission method, comprising:
receiving energy-saving downlink control channel information at a first energy-saving downlink control channel monitor occasion;
according to the received energy-saving downlink control channel information, determining a state of the UE corresponding to each of N time periods associated with the first energy-saving downlink control channel monitor occasion; wherein the state of the UE includes an awake state or a sleep state,
wherein time-related information of the N time periods is DRX parameters, including parameters of long DRX and/or parameters of short DRX,
each bit in the energy-saving downlink control channel information is used to indicate states of UEs corresponding to one or more of the N time periods; or,
n bits in the energy-saving downlink control channel information are used to jointly indicate states of UEs corresponding to k of the N time periods, wherein n and k are integers greater than 1, and n<k≤N.

12. The method according to claim 11, wherein before receiving energy-saving downlink control channel information at a first energy-saving downlink control channel monitor occasion, the method further includes:
receiving first information, wherein the first information includes at least one of the following:
energy-saving downlink control channel monitor occasion;
the number N of the N time periods associated with the first energy-saving downlink control channel monitor occasion;
the time-related information of the N time periods;
the number of bits occupied by energy-saving downlink control channel information of each UE;
the number of time periods corresponding to each bit of n bits;
function indication information related to wake-up of the UE;
function indication information related to sleep of the UE.

13. The method according to claim 11, wherein before, according to the received energy-saving downlink control channel information, determining a state of the UE corresponding to each of N time periods associated with the first energy-saving downlink control channel monitor occasion, the method further includes:
determining the number N of the time periods according to a time interval between two adjacent energy-saving downlink control channel monitor occasions and a duration of the time period; and/or,
determining the number of time periods corresponding to each bit according to the time interval between two adjacent energy-saving downlink control channel monitor occasions, the duration of the time period, and the number of bits occupied by the energy-saving downlink control channel information of the UE.

14. The method according to claim 11, wherein after, according to the received energy-saving downlink control channel information, determining a state of the UE corresponding to each of N time periods associated with the first energy-saving downlink control channel monitor occasion, the method further includes:
in case that there is a second energy-saving downlink control channel monitor occasion between a first time period and a second time period which are adjacent in the N time periods, and the state of the UE corresponding to the second time period is the sleep state, keeping or entering the sleep state at the second energy-saving downlink control channel monitor occasion.

15. A network device, comprising: a transceiver, a memory, a processor, and a computer program stored on the memory and executable on the processor; wherein the processor executes the computer program to perform the steps of the method according to claim 1.

16. A user equipment (UE), comprising: a transceiver, a memory, a processor, and a computer program stored on the memory and executable on the processor; wherein the processor executes the computer program to perform:
receiving energy-saving downlink control channel information at a first energy-saving downlink control channel monitor occasion;
according to the received energy-saving downlink control channel information, determining a state of the UE corresponding to each of N time periods associated with the first energy-saving downlink control channel monitor occasion; wherein the state of the UE includes an awake state or a sleep state,
wherein time-related information of the N time periods is DRX parameters, including parameters of long DRX and/or parameters of short DRX,
each bit in the energy-saving downlink control channel information is used to indicate states of UEs corresponding to one or more of the N time periods; or,
n bits in the energy-saving downlink control channel information are used to jointly indicate states of UEs corresponding to k of the N time periods, wherein n and k are integers greater than 1, and n<k≤N.

17. The UE according to claim 16, wherein the processor executes the computer program to perform:
before receiving energy-saving downlink control channel information at a first energy-saving downlink control channel monitor occasion,
receiving first information, wherein the first information includes at least one of the following:
energy-saving downlink control channel monitor occasion;
the number N of the N time periods associated with the first energy-saving downlink control channel monitor occasion;
the time-related information of the N time periods;
the number of bits occupied by energy-saving downlink control channel information of each UE;
the number of time periods corresponding to each bit of n bits;
function indication information related to wake-up of the UE;
function indication information related to sleep of the UE.

18. The UE according to claim 16, wherein the processor executes the computer program to perform:
- before, according to the received energy-saving downlink control channel information, determining the state of the UE corresponding to each of N time periods associated with the first energy-saving downlink control channel monitor occasion,
- determining the number N of the time periods according to a time interval between two adjacent energy-saving downlink control channel monitor occasions and a duration of the time period; and/or,
- determining the number of time periods corresponding to each bit according to the time interval between two adjacent energy-saving downlink control channel monitor occasions, the duration of the time period, and the number of bits occupied by the energy-saving downlink control channel information of the UE.

19. The UE according to claim 16, wherein the processor executes the computer program to perform:
- after, according to the received energy-saving downlink control channel information, determining the state of the UE corresponding to each of N time periods associated with the first energy-saving downlink control channel monitor occasion,
- in case that there is a second energy-saving downlink control channel monitor occasion between a first time period and a second time period which are adjacent in the N time periods, and the state of the UE corresponding to the second time period is the sleep state, keeping or entering the sleep state at the second energy-saving downlink control channel monitor occasion.

* * * * *